US012618487B2

(12) United States Patent
Lee et al.

(10) Patent No.: US 12,618,487 B2
(45) Date of Patent: May 5, 2026

(54) AUTOMATIC LIQUID DRAIN DEVICE

(71) Applicant: 2CD CO., LTD., Gyeonggi-do (KR)

(72) Inventors: Junbeom Lee, Seoul (KR); Chulhyun Baek, Incheon (KR)

(73) Assignee: 2CD CO., LTD., Goyang-si (KR)

( * ) Notice: Subject to any disclaimer, the term of this patent is extended or adjusted under 35 U.S.C. 154(b) by 0 days.

(21) Appl. No.: 18/726,242

(22) PCT Filed: Mar. 22, 2023

(86) PCT No.: PCT/KR2023/003822
§ 371 (c)(1),
(2) Date: Jul. 2, 2024

(87) PCT Pub. No.: WO2023/182816
PCT Pub. Date: Sep. 28, 2023

(65) Prior Publication Data
US 2025/0067358 A1 Feb. 27, 2025

(30) Foreign Application Priority Data
Mar. 22, 2022 (KR) ........................ 10-2022-0035429

(51) Int. Cl.
*F16T 1/20* (2006.01)
*F16K 24/04* (2006.01)

(52) U.S. Cl.
CPC .............. *F16K 24/044* (2013.01); *F16T 1/20* (2013.01)

(58) Field of Classification Search
CPC ....... F16T 1/20; F16T 1/24; F16T 1/22; F16T 1/383; F16K 24/044; F16K 31/22;
(Continued)

(56) References Cited

U.S. PATENT DOCUMENTS 1,448,972 A * 3/1923 Long ........................ F16T 1/22
251/118
1,451,025 A * 4/1923 Kraft ........................ F16K 1/38
251/347
(Continued)

FOREIGN PATENT DOCUMENTS

JP H07293793 A 11/1995
JP 2007092593 A 4/2007
(Continued)

OTHER PUBLICATIONS

International Search Report, International Patent Application No. PCT/KR2023/003822, Jul. 18, 2023, 4 pgs.
(Continued)

*Primary Examiner* — Craig J Price
(74) *Attorney, Agent, or Firm* — LOZA & LOZA, LLP; Jun S. Ha

(57) ABSTRACT

Proposed is an automatic liquid drain device including a body (10) having a water collection chamber (12) and configured such that an upper cap member (11) having a liquid inlet (13) is fastened to an upper portion of the water collection chamber (12), a buoyancy valve member (20) embedded to be vertically movable in the water collection chamber (12), having downward-inclined ribs (23) and a drop drain (24), and provided with a valve packing (25) protruding from a lower center thereof, a liquid pooling space (122) below the buoyancy valve member (20), and a drain emergency action means (30) provided with a drain nipple (31) having a vertical drain hole (32) whose upper end is exposed to the liquid pooling space (122), and an opening/closing nipple (34) fastened to a lower portion of the drain nipple (31) to open and close the vertical drain hole (32).

4 Claims, 7 Drawing Sheets

(58) Field of Classification Search
CPC . F16K 33/00; F16K 21/04; F16K 1/38; Y02A
30/60; Y10T 137/3034; Y10T 137/3077
USPC ....... 137/195, 181, 192, 196, 179, 433, 429;
210/313; 55/219, 319, DIG. 25, DIG. 17,
55/323, 524, 485, 304, 391, 421, 502,
55/457, 432, 449, 337, 4, 29, 426, 398,
55/345, 458; 96/408, 409; 251/346, 341,
251/144, 351
See application file for complete search history.

(56) References Cited

U.S. PATENT DOCUMENTS

| | | | | |
|---|---|---|---|---|
| 2,313,773 | A * | 3/1943 | Samiran | F02M 33/02 |
| | | | | 137/197 |
| 2,598,706 | A * | 6/1952 | Manning | F16K 24/042 |
| | | | | 137/179 |
| 3,127,255 | A * | 3/1964 | Winslow | B01D 21/10 |
| | | | | 55/421 |
| 3,318,323 | A * | 5/1967 | Pearson | F16T 1/22 |
| | | | | 137/195 |
| 3,378,993 | A * | 4/1968 | Veres | F16T 1/20 |
| | | | | 251/35 |
| 3,934,990 | A * | 1/1976 | Ide, III | B60T 17/004 |
| | | | | 55/432 |
| 3,980,457 | A * | 9/1976 | Smith | B01D 46/0031 |
| | | | | 210/313 |
| 3,993,090 | A * | 11/1976 | Hankison | F16T 1/20 |
| | | | | 137/195 |
| 4,807,847 | A * | 2/1989 | Martz | F16K 1/38 |
| | | | | 251/351 |
| 4,925,466 | A * | 5/1990 | Overby | B01D 46/0031 |
| | | | | 55/319 |
| 5,062,441 | A * | 11/1991 | Glukhov | F16T 1/22 |
| | | | | 137/81.1 |
| 5,122,167 | A * | 6/1992 | Daniels | B01D 39/16 |
| | | | | 96/406 |
| 5,146,947 | A * | 9/1992 | Vetrini | F16T 1/22 |
| | | | | 137/433 |
| 6,287,370 | B1 * | 9/2001 | Kanazawa | F16T 1/20 |
| | | | | 137/181 |
| 7,013,907 | B2 * | 3/2006 | Ryabtsev | E03B 7/077 |
| | | | | 137/198 |
| 10,018,301 | B2 * | 7/2018 | Kornblum | F16T 1/386 |
| 10,203,048 | B2 * | 2/2019 | Matsushita | F16T 1/386 |
| 10,634,128 | B1 * | 4/2020 | Story | F04B 39/16 |
| 12,169,045 | B2 * | 12/2024 | Park | F16T 1/20 |
| 2007/0006918 | A1 * | 1/2007 | Yamamoto | F16T 1/20 |
| | | | | 137/195 |

FOREIGN PATENT DOCUMENTS

| | | |
|---|---|---|
| JP | 3996501 B2 | 10/2007 |
| KR | 101717991 B1 | 3/2017 |
| KR | 101982245 B1 | 5/2019 |
| KR | 102438299 B1 | 8/2022 |

OTHER PUBLICATIONS

International Written Opinion, International Patent Application No.
PCT/KR2023/003822, Jul. 18, 2023, 3 pgs.

* cited by examiner

AUTOMATIC LIQUID DRAIN DEVICE

CROSS-REFERENCE TO RELATED APPLICATIONS

This application is the U.S. national stage of International Patent Application No. PCT/KR2023/003822, filed on Mar. 22, 2023 and entitled "AUTOMATIC LIQUID DRAIN DEVICE", which claims priority to Korean Patent Application No. 10-2022-0035429 filed on Mar. 22, 2022 at the Korean Intellectual Property Office. The disclosure of the foregoing applications is incorporated herein by reference in its entirety.

TECHNICAL FIELD

The present disclosure relates to an automatic liquid drain device and, more particularly, to an automatic liquid drain device that improves the operational reliability of a buoyancy valve member for automatically discharging liquid, enables emergency action in the event of device failure, and ensures product safety.

BACKGROUND ART

As an example of related art, Korea Patent No. 10-1824456 (published Feb. 1, 2018) discloses an automatic liquid discharge device.

However, the conventional technology described above has a problem in that the operational stability is significantly reduced since a float is greatly shaken left and right due to the impact force of liquid falling from a liquid inlet falling on the float, and the device has a complicated structure due to a valve rod at the bottom of the float, which causes an increase in manufacturing costs and weakens price competitiveness.

DISCLOSURE

Technical Problem

The present disclosure is intended to solve the above problems occurring in the related art. An objective of the present disclosure is to provide an automatic liquid drain device with improved operational reliability of a buoyancy valve member for automatically discharging liquid.

An objective of the present disclosure is to provide an automatic liquid drain device improved to enable emergency action in the event of device failure, and ensure safety.

An objective of the present disclosure is to provide an automatic liquid drain device that reduces manufacturing costs and improves competitiveness by distributing a product with improved performance in terms of automatic liquid discharge at a cheaper price.

Technical Solution

In order to achieve the above mentioned objectives, there is provided an automatic liquid drain device including: a body having a water collection chamber and configured such that an upper cap member having a liquid inlet is fastened to an upper portion of the water collection chamber, a buoyancy valve member embedded to be vertically movable in the water collection chamber, having a plurality of downward-inclined ribs provided in a circumferential direction at equal intervals and a drop drain, and provided with a valve packing protruding from a lower center thereof, a liquid pooling space formed in a lower portion of the water collection chamber below the buoyancy valve member, and a drain emergency action means provided with a drain nipple having a vertical drain hole whose upper end is exposed to the liquid pooling space, and an opening/closing nipple fastened to a lower portion of the drain nipple to open and close the vertical drain hole.

The body and the buoyancy valve member may be configured in an inverted cone shape with a diameter that is wide at the top and narrows toward the bottom, at the lower portion of the water collection chamber of the body, an inverted conical inclined inner surface and outer ends of the downward-inclined ribs of the buoyancy valve member may be aligned, and the liquid pooling space may be provided in the water collection chamber below the buoyancy valve member at the point where the inverted conical inclined inner surface and the outer ends of the downward-inclined ribs are aligned.

The opening/closing nipple may have a conical protrusion wheel part that enters and exits the vertical drain hole at a lower center of a fastening hole, and a pair of side drain holes may be provided, one on each side of the conical protrusion wheel part.

The device may further include: a cover member configured to surround the body so that a separation space part is provided outside the body, and to have a pressure fluid discharge hole provided at a bottom of the cover member, wherein a cover upper part of the cover member may be coupled to a fitting groove formed in the upper cap member, and at upper and lower portions of a lower central hole through which the drain nipple passes, a spacer nut and a pressure nut may be fastened to the drain nipple so that a lower part of the cover member is fixed.

Advantageous Effects

According to the present disclosure, overall operational reliability can be greatly improved since up and down movements of a buoyancy valve member for automatically discharging liquid are performed reliably and a valve packing is prevented from coming off and can be replaced when worn.

In addition, according to the present disclosure, product performance can be greatly improved by preventing air (compressed air) leakage by means of an emergency action means in the event of device failure, and product safety can be further ensured by a cover member.

Furthermore, according to the present disclosure, competitiveness can be significantly improved since a product with improved performance can be distributed at a cheaper price while reducing manufacturing costs relative to conventional products.

BEST MODE

Figure 1:
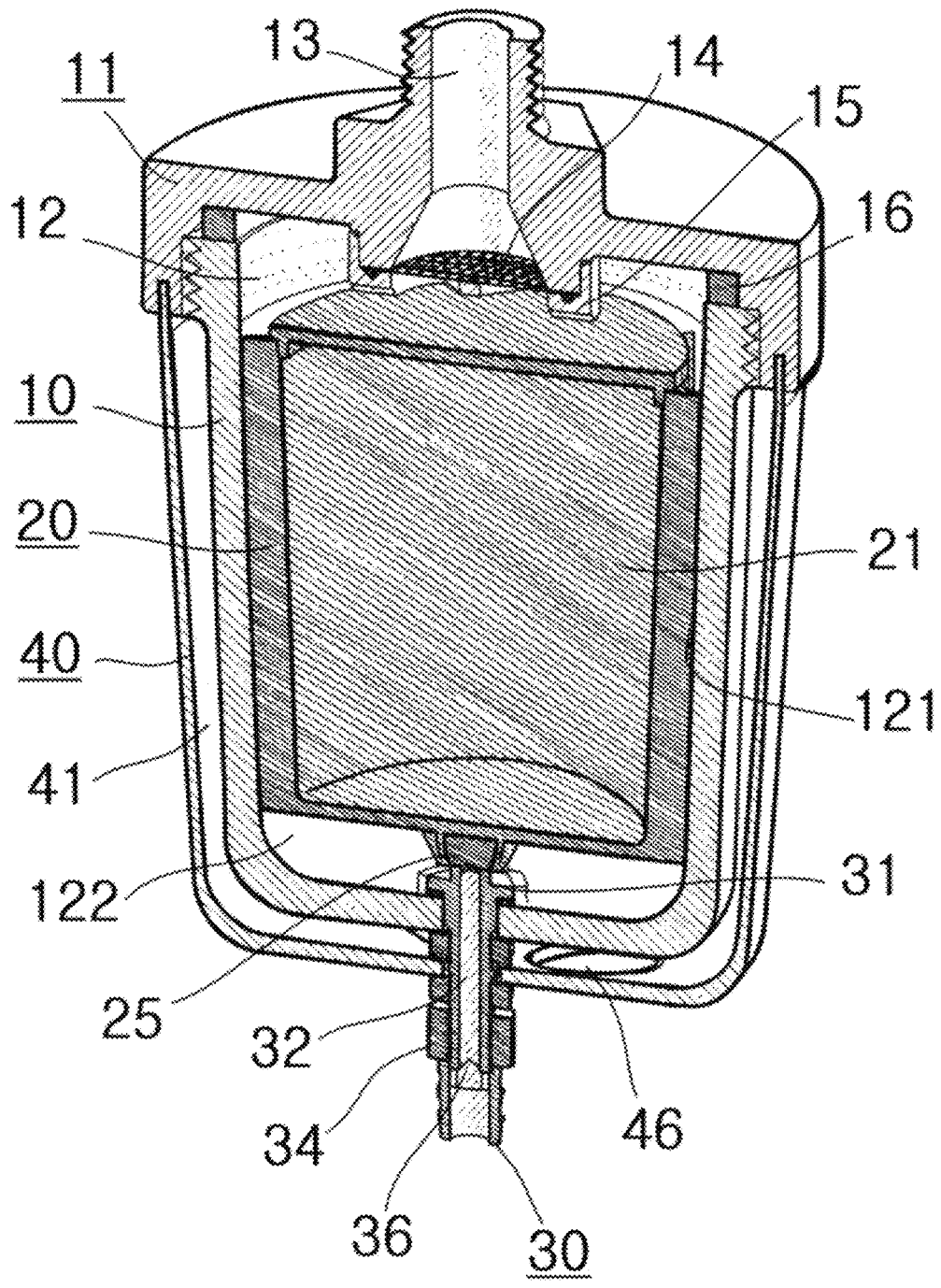
FIG. 1 is a perspective view of the overall longitudinal cross-section of an automatic liquid drain device according to the present disclosure.

The present disclosure includes: a body 10 having a water collection chamber 12 and configured such that an upper cap member 11 having a liquid inlet 13 is fastened to an upper portion of the water collection chamber 12; and a buoyancy valve member 20 embedded to be vertically movable in the water collection chamber 12, having a plurality of downward-inclined ribs 23 provided in a circumferential direction at equal intervals and a drop drain 24, and provided with a valve packing 25 protruding from the lower center thereof.

In addition, the present disclosure includes: a liquid pooling space 122 created in the lower portion of the water collection chamber 12 below the buoyancy valve member 20; and a drain emergency action means 30 provided with a drain nipple 31 having a vertical drain hole 32 whose upper end is exposed to the liquid pooling space 122, and an opening/closing nipple 34 fastened to the lower portion of the drain nipple 31 to open and close the vertical drain hole 32, the wherein opening/closing nipple 34 has a conical protrusion wheel part 36 that enters and exits the vertical drain hole 32 at the lower center of a fastening hole 35, and a pair of side drain holes 37 is provided, one on each side of the conical protrusion wheel part 36.

MODE FOR INVENTION

In order to fully understand the present disclosure, preferred embodiments will be described in detail with reference to the accompanying drawings as follows.

Embodiments of the present disclosure may be modified in various forms, and the scope of the present disclosure should not be construed as limited to the embodiments described in detail below. The embodiments are provided to more completely explain the present disclosure to those with average knowledge in the art. Detailed descriptions of known functions and configurations that are judged to unnecessarily obscure the gist of the present disclosure may be omitted.

Figure 2:
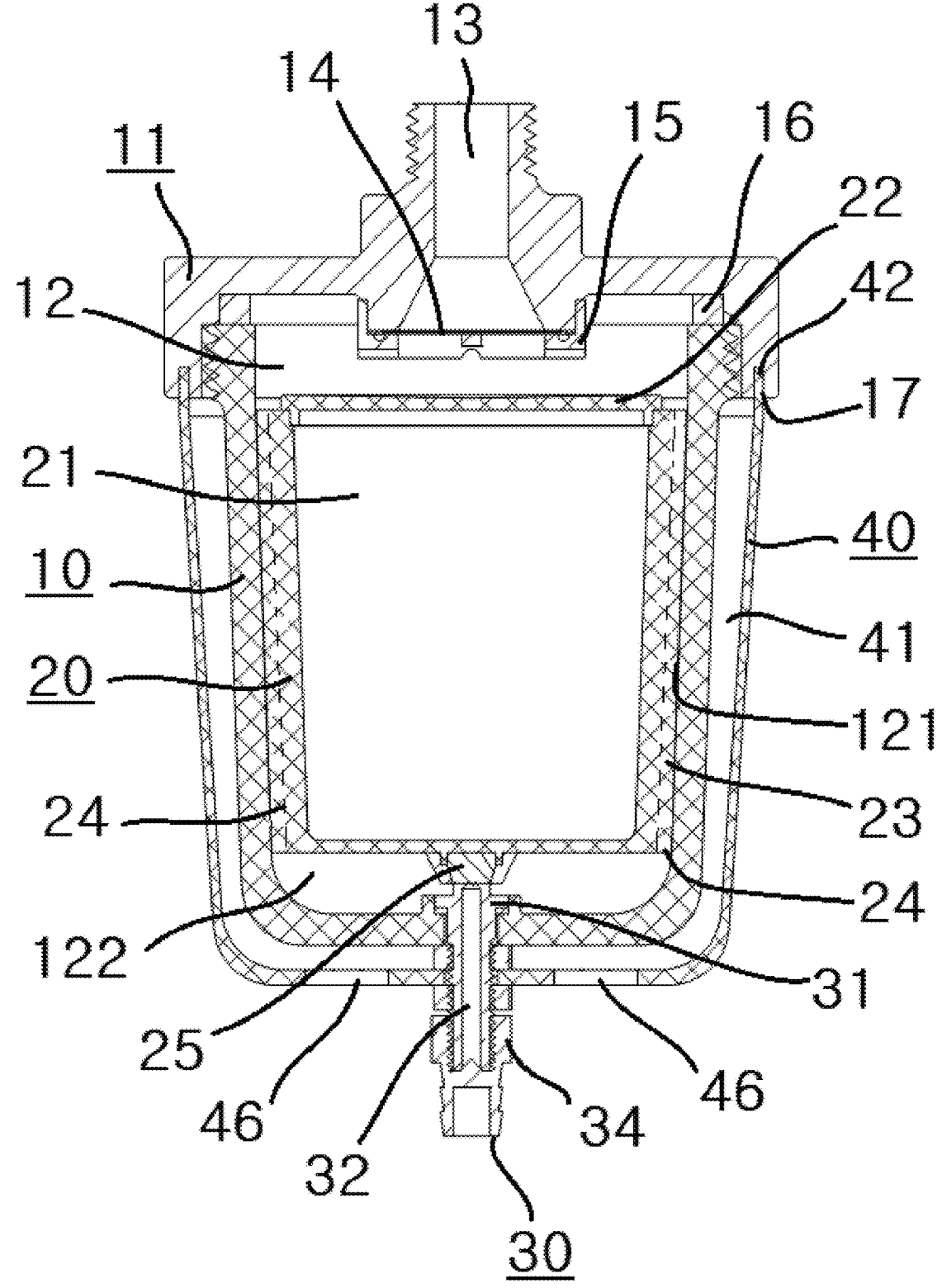
FIG. 2 is an overall longitudinal cross-sectional view of the automatic liquid drain device according to the present disclosure.

As shown in FIGS. 1 and 2, the present disclosure is broadly divided into: a body 10 configured such that an upper cap member 11 is fastened to an upper portion thereof; a buoyancy valve member 20 inserted into a water collection chamber 12 provided in the body 10 and installed to be movable in the vertical direction; a drain emergency action means 30 provided at the lower portion of the body 10 to drain liquid; and a cover member 40 provided to cover the outside of the body 10.

The water collection chamber 12 of the body 10 is configured in the shape of an inverted cone with a diameter that is wide at the top and narrows toward the bottom so as to have an inverted conical inclined inner surface 121.

The upper cap member 11 is configured to have a liquid inlet 13 at the top thereof and a filtering net 14 at the bottom of the liquid inlet 13, so that foreign substances mixed in liquid flowing into the liquid inlet 13 may be filtered out.

Beneath the filtering net 14, a net fastener 15 is fastened to the lower portion of the upper cap member 11 so as to fix the filtering net 14.

In the present disclosure, the buoyancy valve member 20 is inserted into the water collection chamber 12 of the body 10 and then fixed so that the upper cap member 11 is fastened to the upper portion of the body 10. It is desirable to place a rubber packing 16 between the body 10 and the upper cap member 11 to prevent liquid leakage.

The body 10 is preferably made of a plastic material so that the buoyancy valve member 20 in the water collection chamber 12 may be visually identified. The upper cap member 11 is preferably made of a metal material in order to prevent the body 10 from being deformed as much as possible.

The buoyancy valve member 20 is preferably configured to have a buoyancy generating air chamber 21 therein and to be fixed so that a sealing cap member 22 is covered on the top of the buoyancy generating air chamber 21. The buoyancy valve member 20 is preferably made of a plastic material with a lower specific gravity than water.

Figure 3:
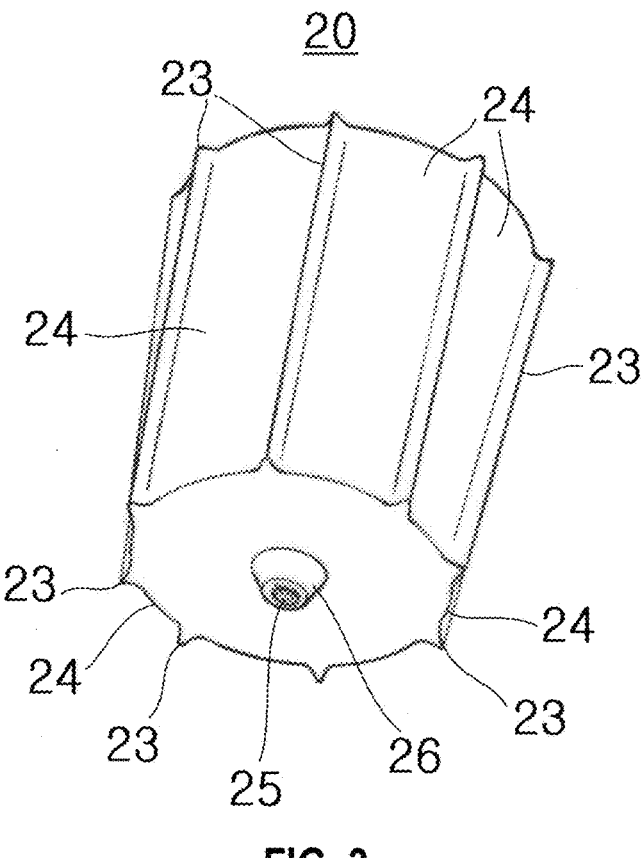
FIG. 3 is a perspective view showing a buoyancy valve member of the present disclosure.
Figure 4:
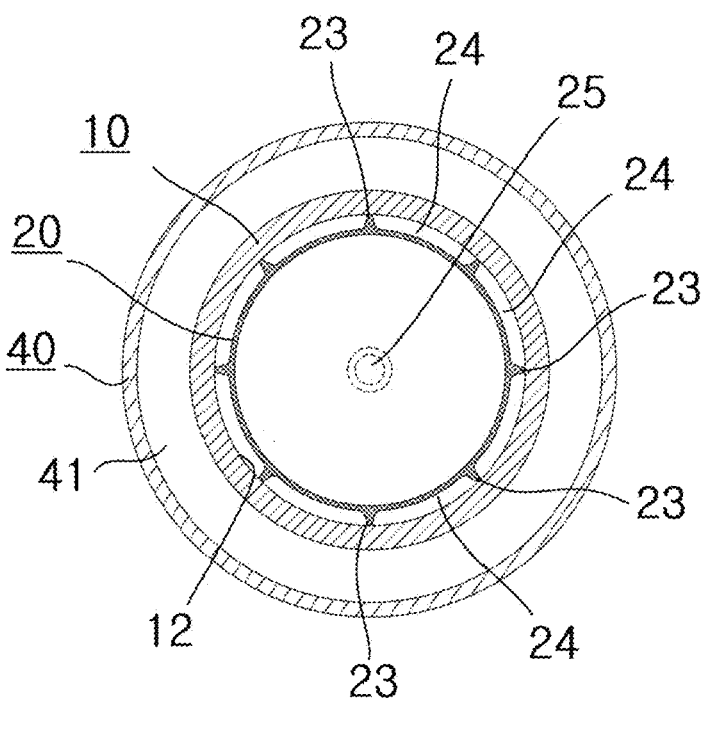
FIG. 4 is a flat cross-sectional view showing the installation state of the buoyancy valve member of the present disclosure.

In addition, the buoyancy valve member 20 has an inverted cone shape with a diameter that is wide at the top that narrows toward the bottom, and is configured to have a plurality of downward-inclined ribs 23 protruding at equal intervals in a downward direction as shown in FIGS. 3 and 4 on the outer peripheral surface thereof and to have a drop drain 24 between each pair of the downward-inclined ribs 23. That is, the downward-inclined ribs 23 protrude parallel to each other in the vertical direction of the inverted cone-shaped outer peripheral surface of the buoyancy valve member 20.

As shown in FIG. 2, the present disclosure is configured such that an inverted cone-shaped valve packing 25 provided at the lower center of the buoyancy valve member 20 and the upper end of a drain nipple 31 of the drain emergency action means 30 are in contact with each other while the inverted conical inclined inner surface 121 of the water collection chamber 12 and the outer ends of the downward-inclined ribs 23 of the buoyancy valve member 20 are aligned in a state in which the buoyancy valve member 20 is completely moved in the downward direction. In addition, in the above state, the lower portion of the buoyancy valve member 20 is configured to form a liquid pooling space 122 in which liquid W accumulates.

Figure 5:
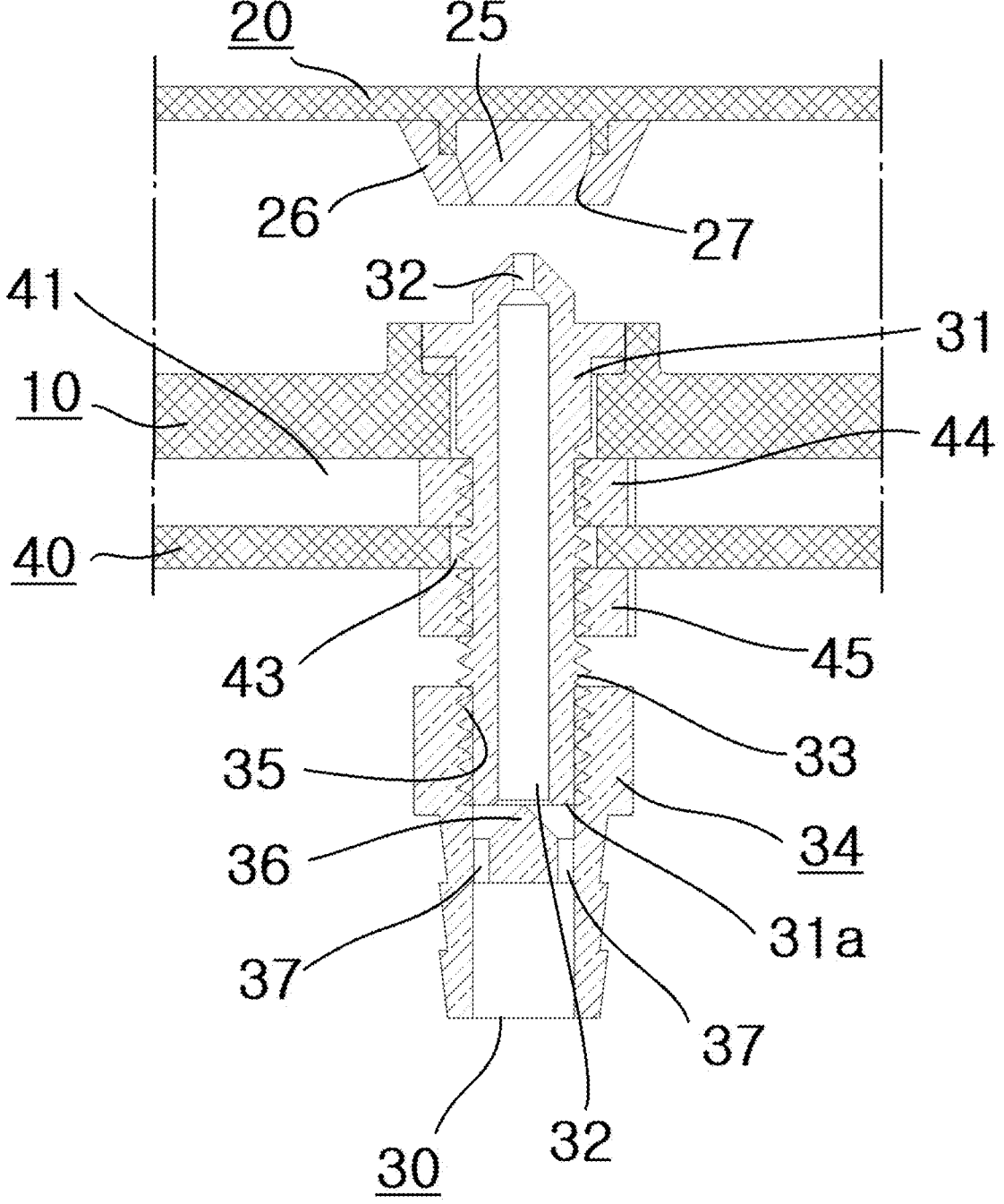
FIG. 5 is a cross-sectional view showing a drain emergency action means of the present disclosure.

The inverted cone-shaped valve packing 25 is preferably made of silicone rubber, and is configured to be fixed to the buoyancy valve member 20 by a packing holder 26 that is detachably installed at the center of the bottom of the buoyancy valve member 20 as shown in FIG. 5.

The packing holder 26 has an inverted cone-shaped mounting hole 27 in the center thereof, and the inverted cone-shaped valve packing 25 of the same shape as the mounting hole 27 is built into the inverted cone-shaped mounting hole 27, so that part of the inverted cone-shaped valve packing 25 is exposed to the lower portion of the packing holder 26.

Since the inverted cone-shaped valve packing 25 is mounted in the inverted cone-shaped mounting hole 27 of the packing holder 26, that is, because they are all constructed in the form of an inverted cone with a relatively wide upper diameter and a relatively small lower diameter, the inverted cone-shaped valve packing 25 does not come off toward the bottom of the packing holder 26. Accordingly, even if the buoyancy valve member 20 is moved in the vertical direction, the inverted cone-shaped valve packing 25 is never separated from the buoyancy valve member 20.

Thus, device malfunction due to separation of the inverted cone-shaped valve packing 25 may be prevented, and product reliability may be greatly improved.

In addition, the packing holder 26 may be screwed to the bottom of the buoyancy valve member 20, or may be mounted in an interference fit manner. Since the packing holder 26 is removable from the buoyancy valve member 20, when the inverted cone-shaped valve packing 25 is worn or defective, the packing holder 26 may be separated and only the inverted cone-shaped valve packing 25 may be replaced.

Referring to FIG. 2, in the present disclosure, liquid flows into the water collection chamber 12 through the liquid inlet 13, and falls on the upper surface of the buoyancy valve member 20 to spread in all directions, flowing downward through the drop drain 24 on the outer peripheral surface of the buoyancy valve member 20.

The liquid flowing down the drop drain 24 is filled in the liquid pooling space 122, and as the liquid gradually fills up to the middle part of the upper drop drain 24, the buoyancy valve member 20 is moved to float upward due to the buoyancy force generated. Accordingly, the inverted cone-shaped valve packing 25, which was shielding the vertical drain hole 32 of the drain nipple 31, moves upward and falls away from the drain nipple 31, thereby opening the vertical drain hole 32. As a result, the liquid W in the liquid pooling space 122 is discharged into the vertical drain hole 32.

Figure 6:
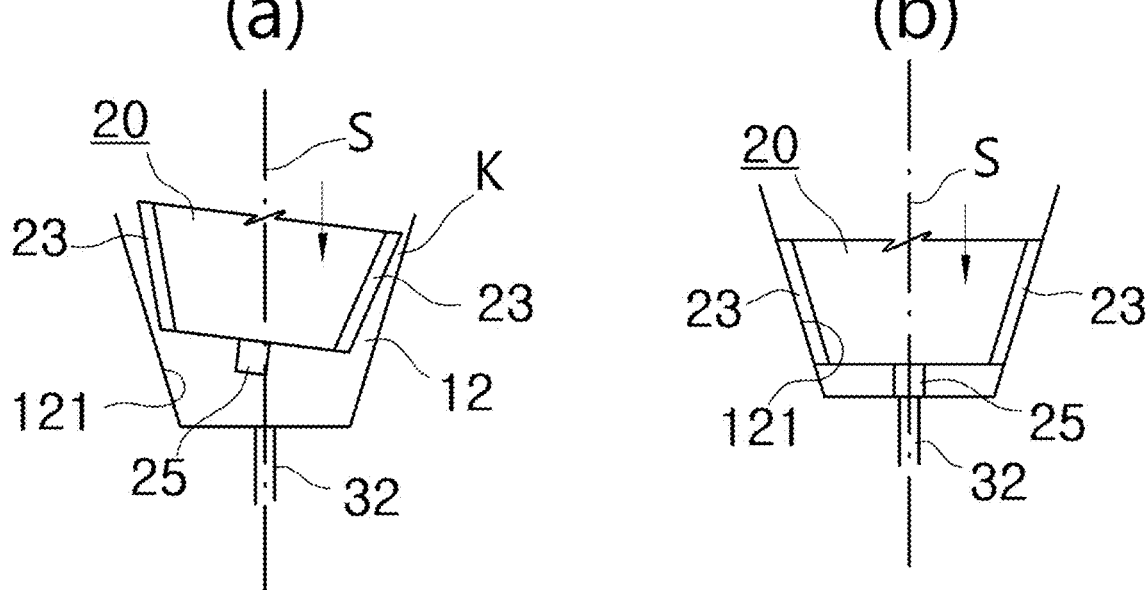
FIGS. 6(a) and 6(b) are schematic diagrams showing the operation of the buoyancy valve member of the present disclosure.

In the present disclosure, because both the water collection chamber 12 and the buoyancy valve member 20 are configured in an inverted cone shape, the buoyancy valve member 20 may tilt, although it is not significantly visible to the naked eye, in one direction when the buoyancy valve member 20 is moved upward by buoyancy. Accordingly, as shown in FIG. 6(*a*), the downward-inclined rib 23 is also inclined, and a gap K is inevitably generated between the inverted conical inclined inner surface 121 and the downward-inclined rib 23, so that a vertical center line S of the vertical drain hole 32 and the inverted cone-shaped valve packing 25 are not aligned in a vertical state.

However, in the present disclosure, even if the gap K as described above occurs and the vertical center line S of the vertical drain hole 32 and the inverted cone-shaped valve packing 25 are not aligned in a vertical state, when the buoyancy valve member 20 is moved downward, the downward-inclined ribs 23 contact the inverted conical inclined inner surface 121 and gradually move down, so that the buoyancy valve member 20 is gradually erected in the vertical direction. Eventually, as shown in FIG. 6(*b*), the downward-inclined ribs 23 are seated in a state of alignment with the inverted conical inclined inner surface 121, and the vertical center line S of the vertical drain hole 32 and the inverted cone-shaped valve packing 25 are aligned, thereby shielding the vertical drain hole 32 without malfunction.

In addition, as the above-described action of the liquid w gradually flowing into the liquid pooling space 122 and the buoyancy valve member 20 moving upward due to buoyancy to drain the water and then moving downward to shield the vertical drain hole 32 is repeatedly operated, the liquid W is drained automatically at any time.

As shown in FIG. 5, as for the drain emergency action means 30 provided at the lower center of the water collection chamber 12 of the body 10, the elongated drain nipple 31 with a vertical drain hole 32 in communication to the water collection chamber 12 is fixed to the lower center of the body 10, and an opening/closing nipple 34 is fastened to a fastening screw part 33 on the lower side of the drain nipple 31.

In the opening/closing nipple 34, a conical protrusion wheel part 36, which is inserted into and detached from the vertical drain hole 32, protrudes from the lower center of a fastening hole 35, which is fastened to the fastening screw part 33. A pair of side drain holes 37 is provided, one on each side of the protrusion wheel part 36, and the side drain holes 37 are configured to be shielded by contacting a nipple bottom end surface 31*a* of the opening/closing nipple 34.

Figure 7:
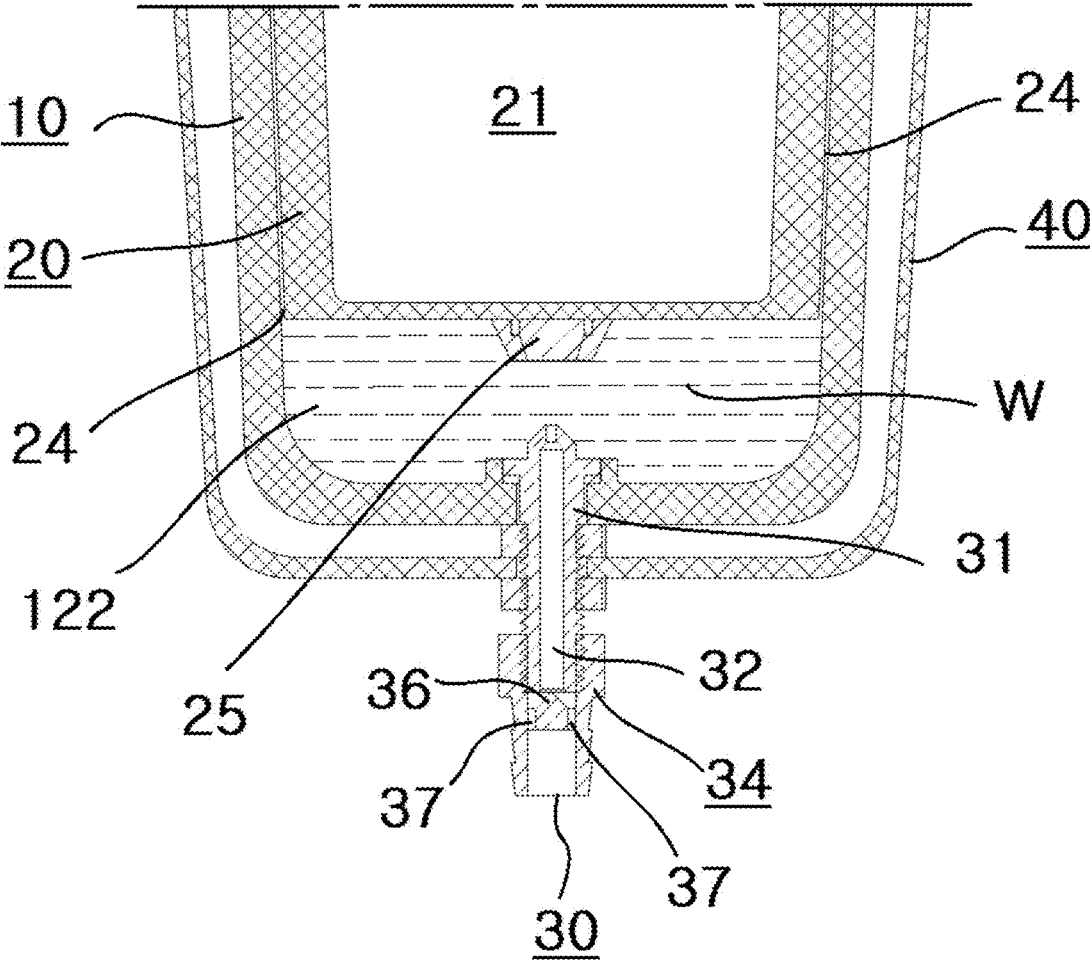
FIG. 7 is a longitudinal cross-sectional view showing the operation of the present disclosure during normal operation.

Thus, when the opening/closing nipple 34 is rotated to move toward the bottom of the drain nipple 31, the protrusion wheel part 36 is separated from the drain hole 32, thereby leaving the drain hole 32 open as shown in FIG. 7.

Therefore, the liquid W discharged through the drain hole 32 may be discharged through the side drain holes 37, and thus in normal operating conditions, the liquid W will be able to be discharged through the side drain holes 37.

Figure 8:
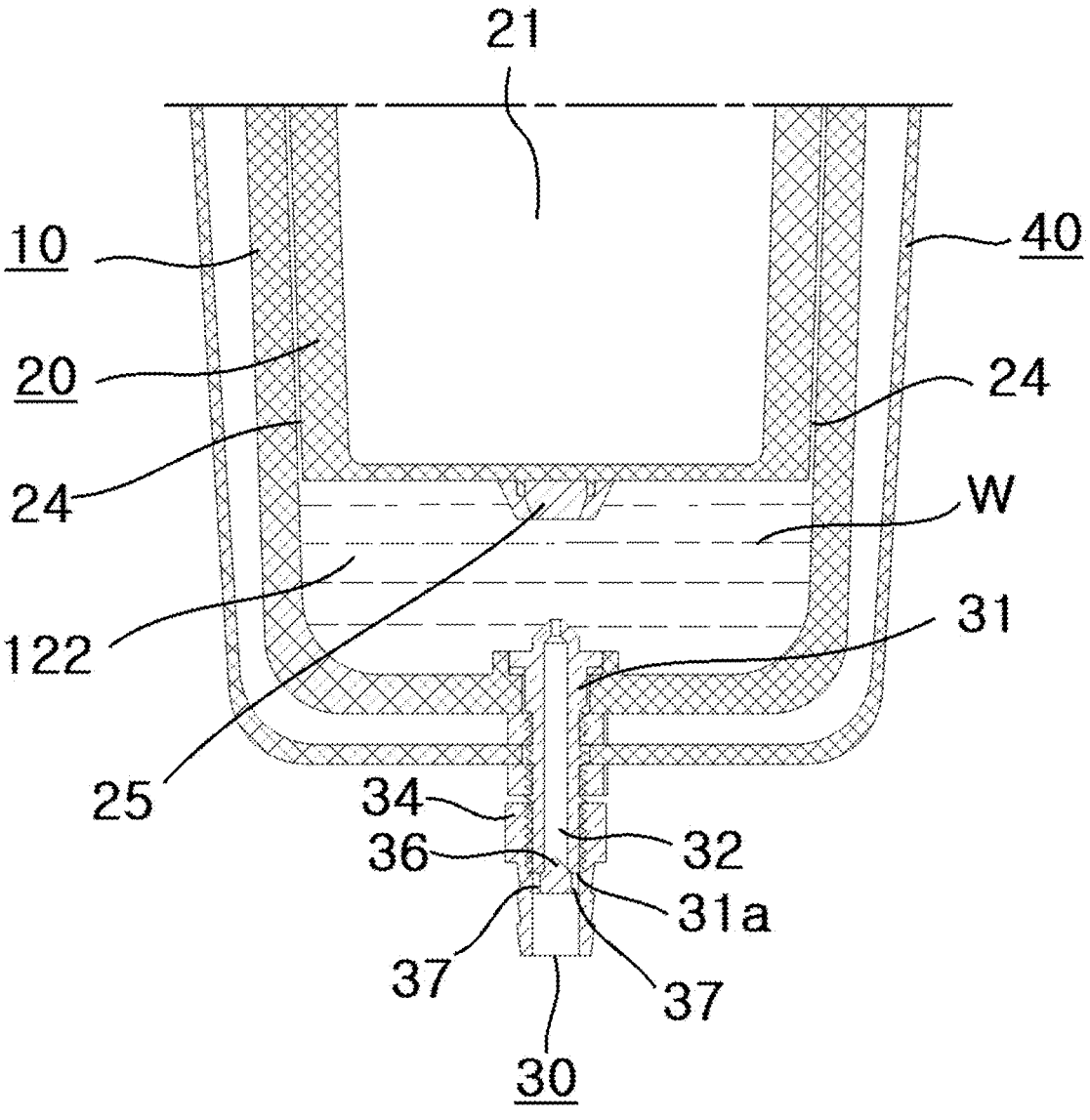
FIG. 8 is a longitudinal cross-sectional view showing the emergency operation of the present disclosure.

However, when it is necessary to block the discharge of the liquid W due to various factors such as a malfunction, by rotating the opening/closing nipple 34 to move toward the upper portion of the drain nipple 31, the protrusion wheel part 36 is inserted into the drain hole 32 to shield the drain hole 32 as shown in FIG. 8, and the side drain holes 37 come into contact with the nipple bottom end surface 31*a* of the opening/closing nipple 34, resulting in double shielding.

To aid understanding of the present disclosure, an automatic liquid drain device such as the present disclosure is mainly installed at the bottom of a compressed air transfer pipe in a pneumatic system that uses compressed air using an air compressor, and is to automatically drain condensate (liquid) generated within the compressed air transfer pipe.

The problem is that, when the amount condensate generated is small, compressed air may be discharged by means of the automatic liquid drain device. In this case, the pneumatic force that powers the pneumatic system is weakened, causing disruption in production or operation.

In the present disclosure, however, even if a small amount of condensate (liquid) is generated, the inverted cone-shaped valve packing 25 of the buoyancy valve member 20 always shields the vertical drain hole 32, and thus compressed air does not leak through the drain hole 32.

In addition, usually, multiple automatic liquid drain devices are installed at equal intervals on a long compressed air transfer pipe to efficiently discharge condensate. The problem is that, when one of the multiple automatic liquid drain devices is used for a long period of time, for example, the vertical drain hole 32 may be always open due to various factors such as excessive wear of the inverted cone-shaped valve packing 25, foreign substances sticking to the packing 25, or defective parts, etc., causing compressed air to leak. As a result, the pneumatic force of the compressed air that powers the pneumatic system is weakened, which may interfere with production or operation.

In contrast, according to the present disclosure, there is no disruption to the operation of the pneumatic system because, in emergency situations such as the above, the opening/closing nipple 34 is rotated to shield the vertical drain hole 32 and the side drain holes 37 in order to prevent compressed air from leaking, and then the malfunction is repaired later.

Referring back to FIGS. 1 and 2, in the present disclosure, the cover member 40 is covered on the outside of the body 10 in a state where there is a separation space part 41 between the body 10 and the cover member 40.

The cover member 40 is preferably made of a transparent plastic material, and is configured to be firmly fixed as a cover upper part 42 is coupled to a fitting groove 17 formed in the upper cap member 11 as shown in FIG. 2, while at upper and lower portions of a lower central hole 43 through which the drain nipple 31 passes, a spacer nut 44 and a pressure nut 45 are fastened to the drain nipple 31 so that the lower part of the cover member 40 is fixed as shown in FIG. 5.

Thus, in the event that an external force is applied due to carelessness, for example, the external force is first applied to the cover member 40 and the device is protected, or only the cover member 40 is damaged and the body 10 is safely protected without damage.

Furthermore, in the event that the body 10 is not able to withstand the internal pressure (compressed air pressure) and ruptures, for example, the cover member 40 blocks debris from flying out of the device, preventing injuries to nearby workers.

At this time, high-pressure compressed air is discharged through a pressure fluid discharge hole 46 provided at the bottom of the cover member 40, thereby preventing damage to the cover member 40. In addition, by keeping the broken pieces of the body 10 within the cover member 40, injuries may be avoided and safety may be enhanced.

The present disclosure is not necessarily limited to what is shown and described in the drawings, and may be modified and implemented in various ways by those skilled in the art to which the present disclosure pertains. Therefore, it is obvious that the present disclosure should be broadly protected as long as it does not significantly depart from the scope of the claims.

INDUSTRIAL APPLICABILITY

The present disclosure relates to an automatic liquid drain device that improves the operational reliability of a buoyancy valve member for automatically discharging liquid, enables emergency action in the event of device failure, and ensures safety. According to the present disclosure, a buoyancy valve member 20 moves up and down within a water collection chamber 12 of a body 10 so that the water in a liquid pooling space 122 may be automatically drained into a vertical drain hole 32, and a drain emergency action means 30 is provided that is operated to open and close the vertical drain hole 32 as needed, and thus action may be easily taken in case of emergency such as when a malfunction occurs. The present disclosure may be installed in a steam piping line in a facility installed in a steam piping and used to automatically drain steam condensate.

The invention claimed is:

1. An automatic liquid drain device, comprising:

a body (10) having a water collection chamber (12) and configured such that an upper cap member (11) having a liquid inlet (13) is fastened to an upper portion of the water collection chamber (12);

a buoyancy valve member (20) embedded to be vertically movable in the water collection chamber (12), the buoyancy valve member (20) having a plurality of downward-inclined ribs (23) provided in a circumferential direction at equal intervals and a drop drain (24), and being provided with a valve packing (25) protruding from a lower center thereof;

a liquid pooling space (122) formed in a lower portion of the water collection chamber (12) below the buoyancy valve member (20); and a drain emergency action means (30) provided with a drain nipple (31) having a vertical drain hole (32) whose upper end is exposed to the liquid pooling space (122), and an opening/closing nipple (34) fastened to a lower portion of the drain nipple (31) to open and close the vertical drain hole (32), wherein the opening/closing nipple (34) has a conical protrusion wheel part (36) configured to enter and exit the vertical drain hole (32) at a lower center of a fastening hole (35), and a pair of side drain holes (37) is provided, one on each side of the conical protrusion wheel part (36) outside of the conical protrusion wheel part (36), the pair of side drain holes (37) being connected to a drain path below the conical protrusion wheel part (36), and wherein the pair of side drain holes are outside of the conical protrusion wheel part (36).

2. The device of claim 1, further comprising:

a cover member (40) configured to surround the body (10) so that a separation space part (41) is provided outside the body (10), and to have a pressure fluid discharge hole (46) provided at a bottom of the cover member (40), wherein a cover upper part (42) of the cover member (40) is coupled to a fitting groove (17) formed in the upper cap member (11), and at upper and lower portions of a lower central hole (43) through which the drain nipple (31) passes, a spacer nut (44) and a pressure nut (45) are fastened to the drain nipple (31) so that a lower part of the cover member (40) is fixed.

3. The device of claim 1, wherein the conical protrusion wheel part (36) comprises a top portion facing the vertical drain hole (32) and having a cone shape and a bottom portion below the top portion, the bottom portion being a cylinder, and wherein the pair of side drain holes (37) are located outside of the bottom portion.

4. The device of claim 1, further comprising:

a packing holder (26) detachably installed at a bottom of the buoyancy valve member (20) facing the liquid pooling space (122) and comprising an inverted cone-shaped mounting hole (27), wherein the valve packing (25) mounted within the inverted cone-shaped mounting hole (27), the valve packing (25) being inverted cone-shaped to correspond to an inverted cone-shape of the inverted cone-shaped mounting hole (27).

* * * * *